Sept. 1, 1936.  W. JUFFA  2,052,713
REDUCING PIECE FOR STANDARD GROUND SURFACES
Filed Aug. 4, 1934

INVENTOR
WILHELM JUFFA
BY
ATTORNEYS

Patented Sept. 1, 1936

2,052,713

UNITED STATES PATENT OFFICE 2,052,713

REDUCING PIECE FOR STANDARD GROUND SURFACES

Wilhelm Juffa, Ilmenau, Germany

Application August 4, 1934, Serial No. 738,396
In Germany June 7, 1934

1 Claim. (Cl. 285—183)

This invention relates to reducing pieces for standard ground surfaces with two ground connecting end members of different diameters and similar conicity. In these the ground portion of larger diameter is generally at one end of the adapter and the ground portion of smaller diameter at the other end thereof, whereas between the two ground portions there is a throat portion which serves as transition between the two cones.

The invention relates to a reducing piece which presents the advantage that it is much simpler, more convenient and practical in use and allows of a large number of variations. Of the known reducing pieces some reduce from 60 to 55 mms. and others from 55 to 50 mms. and so forth, so that a complete set is required. However, a reduction from 60 to 40 mms. or from 45 to 20 and so forth is not possible with such reducing pieces. This is rendered possible by means of the invention in the simplest manner imaginable.

The invention is characterized in that the conical ground parts of the reducing piece are no longer situated one behind the other as heretofore, but extend over the same portion of the length of the reducing piece and overlap, the wall thickness of the reducing piece between the ground portion of larger diameter and that of smaller diameter being thicker so much that a transition from one standard width to another is possible. Consequently, the whole reducing piece according to the invention consists solely of a simple cone, the wall of which has on its outer side the ground surface of larger diameter and on its inner side the ground surface of smaller diameter, whereas above the two overlapping ground portions a common edge portion is provided in such a manner that any desired number of reducing pieces can be inserted one within the other without lengthening the length of the whole set, the edge portions of the reducing pieces slipped one into the other lying closely the one on the other.

The invention is based on the idea that for a practical reduction of the diameter the two ground portions can be arranged the one within the other if the principle is applied that the wall thickness between the two ground portions is increased by the same amount as the width difference of the standardation between two sizes. Consequently, the reducing piece according to the invention is not only half as long as heretofore but it is also possible to insert the one into the other any number of reducing pieces of different sizes without appreciably increasing the length of the whole reducing arrangement, which was not possible with the reducing pieces hitherto known. Consequently, four or five reducing pieces can be slipped the one into the other in such a manner that it is possible to reduce from any larger diameter to any smaller diameter with the aid of a single set of reducing pieces. Thus, a much greater possibility of variation can be obtained and moreover only a fraction of the reducing pieces is necessary therefor.

According to the invention the wall thickness between the ground portion of larger diameter and that of smaller diameter can even be increased to such an extent that one or several widths of the standardized connecting elements can be omitted.

Several embodiments of the invention are illustrated in the accompanying drawing in which:—

Fig. 7 is a longitudinal section of reducing pieces provided with funnel-shaped enlargement for catching drops and the like.

Figure 1:
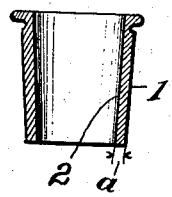
Fig. 1 shows in longitudinal section a reduction piece for standard ground portions consisting of a simple cone.
Figure 2:
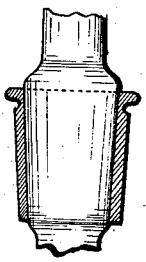
Fig. 2 shows the reducing piece in use.
Figure 10:
Fig. 10 shows in elevation another construction of the reducing pieces.

According to Fig. 1 the reducing piece consists of a hollow cone having on its outer side a ground surface 1 corresponding to the larger diameter and on its inner side a ground surface 2 corresponding to the smaller diameter. The ground surfaces are therefore one within the other and overlap, and the wall thickness $a$ between the two surfaces is according to the invention increased to such an extent that it corresponds to the difference in width of the standardization between two different standard reducing pieces. In the example illustrated the wall thickness amounts to 2.5 mms. Above the two ground surfaces 1, 2 a laterally projecting edge portion 3 is provided for gripping the reducing piece element.

Figure 3:
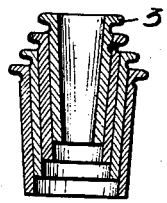
Fig. 3 shows in longitudinal section a nest of reducing pieces slipped one into the other in order to reduce from any desired larger diameter to any desired smaller diameter without considerably increasing the length of the whole reducing piece.

Fig. 3 shows how a plurality of reducing pieces can be placed one within the other in order to reduce from any larger diameter to any other diameter without considerably increasing the length of the reducing device. Therefore, not only the ground portions of each reducing piece register but the ground portions of the individual nested reducing pieces bear one against the other and are lying one within the other and the individual edge portions 3 of the individual reducing pieces are close together.

Figure 4:
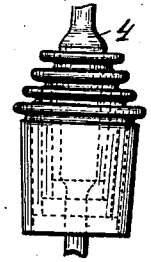
Fig. 4 is a side elevation showing this nest of reducing pieces in use.

The employment of this arrangement is illustrated in Fig. 4, wherein a thin flask 4 is shown which is to be fitted into a correspondingly wider vessel. For this purpose a plurality of reducing pieces are fitted one within the other.

Figure 5:
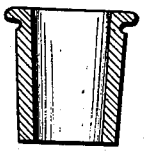
Figs. 5 and 6 are longitudinal sections showing reducing pieces with walls of different thickness.
Figure 6:
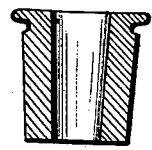
Figure 8:
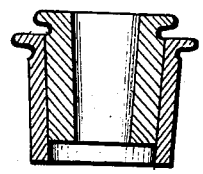
Fig. 8 is a longitudinal section showing a combination of reducing pieces with walls of different thicknesses.

In the construction illustrated in Figs. 5 and 6 the wall thickness between the ground portion of larger diameter and that of smaller diameter is doubled and trebled respectively, so that this reducing piece can reduce by double or three times the amount. This wall thickness can be increased as desired. These thick reducing pieces can then be employed in combination with thinner reducing pieces, for example as illustrated in Fig. 8.

Figure 7:
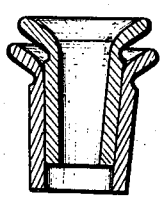

In the form of construction shown in Fig. 7 the reducing pieces have a funnel-shaped widening designed to catch drops and the like.

Figure 9:
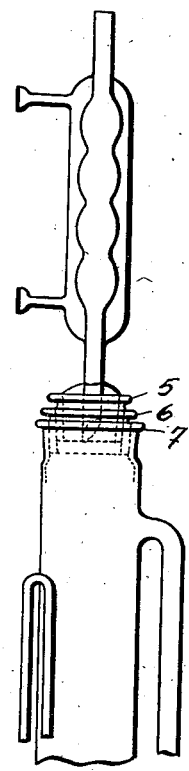
Fig. 9 shows in elevation the employment of the reducing pieces for an extracting apparatus with cooler mounted thereon.

Fig. 9 shows the employment of the reducing pieces for an extracting apparatus with cooler fitted thereon. Hitherto a separate cooler was required for each extracting apparatus. According to the invention, by nesting the reducing pieces according to the invention, any cooler can be employed with any extracting apparatus. This figure shows that neither the length nor the stability of the apparatus is affected by the nesting of several reducing pieces 5, 6, 7.

The reducing pieces are made chiefly of glass but can also be supplied in porcelain or other material. They are produced either by hand on a lamp or, especially in the case of strong constructions, by pressing. The reducing pieces constructed in accordance with the principles of the present invention are used in connection with glass instruments of the type employed in laboratories for measuring purposes. A number of glass instruments used in laboratories consist of two or more glass containers which are usually placed one on top of the other and which must be connected with each other in an airtight manner. Devices used for distillation and extraction purposes are further instances of glass containers which must be arranged one above the other.

The reducing piece constructed in accordance with the present invention provides inexpensive and effectively operating means for connecting the glass containers with each other in an airtight manner. An important advantage of the present invention is the possibility of using a small number of reducing pieces in order to connect with each other openings of glass instruments which have different diameters. Heretofore, it was necessary to use a separate reducing piece whenever it was necessary to connect an opening having one diameter with an opening having a different diameter. Through the provision of reducing pieces provided with outer and inner ground surfaces, it is possible to use a small number of reducing pieces for a great variety of different diameters.

I claim:—

The combination with a container and a tubular member; of a device for interconnecting said container and said tubular member, said device comprising a plurality of frustro-conical reducing pieces consisting of glass, each of said frusto-conical reducing pieces having an exterior ground surface and an interior ground surface, said surfaces being concentric and extending over substantially the same portion of the length of the piece, said reducing pieces being adapted to telescope each other in step formation, the bottom piece being adapted to be inserted into said container, the interior surface of the top piece being adapted to engage said tubular member, the exterior surface and the interior surface of each reducing piece being adapted to establish an air-tight connection, whereby said tubular member and said container are interconnected in an air-tight manner, the cross-section of said container being reduced by the reducing pieces to any desired size without substantial elongation of the container.

WILHELM JUFFA.